United States Patent [19]
Ng et al.

[11] Patent Number: 5,640,845
[45] Date of Patent: Jun. 24, 1997

[54] NITROGEN SPARK DENOXER

[75] Inventors: Henry K. Ng, Naperville; Vincent J. Novick, Downers Grove; Ramanujam R. Sekar, Naperville, all of Ill.

[73] Assignee: The University of Chicago, Chicago, Ill.

[21] Appl. No.: 433,219

[22] Filed: May 2, 1995

Related U.S. Application Data

[63] Continuation-in-part of Ser. No. 19,102, Feb. 18, 1993.

[51] Int. Cl.$^6$ .................................................. F01N 3/18
[52] U.S. Cl. .................................................. 60/274; 60/275
[58] Field of Search ............................ 60/274, 275, 303

[56] References Cited

U.S. PATENT DOCUMENTS

| | | | |
|---|---|---|---|
| 3,091,920 | 6/1963 | Matvay | 60/275 |
| 3,846,637 | 11/1974 | Gettinger | 60/275 |
| 4,587,807 | 5/1986 | Suzuki | 60/275 |
| 5,041,145 | 8/1991 | Kakinuma | 60/275 |
| 5,051,113 | 9/1991 | Nemser . | |
| 5,051,114 | 9/1991 | Nemser et al. . | |

FOREIGN PATENT DOCUMENTS 3409859 9/1995 Germany .

OTHER PUBLICATIONS

Translation of German pat No. 3409859.
Hilliard, J.C. and F.J. Weinberg, "Effect of nitrogen-containing plasmas on stability, NO formation and sooting of flames", *Nature*, vol. 259 pp. 556–557, Feb. 9, 1976.

*Primary Examiner*—Douglas Hart
*Attorney, Agent, or Firm*—Mason, Kolehmainen, Rathburn & Wyss

[57] ABSTRACT

A $NO_X$ control system for an internal combustion engine includes an oxygen enrichment device that produces oxygen and nitrogen enriched air. The nitrogen enriched air contains molecular nitrogen that is provided to a spark plug that is mounted in an exhaust outlet of an internal combustion engine. As the nitrogen enriched air is expelled at the spark gap of the spark plug, the nitrogen enriched air is exposed to a pulsating spark that is generated across the spark gap of the spark plug. The spark gap is elongated so that a sufficient amount of atomic nitrogen is produced and is injected into the exhaust of the internal combustion engine. The injection of the atomic nitrogen into the exhaust of the internal combustion engine causes the oxides of nitrogen to be reduced into nitrogen and oxygen such that the emissions from the engine will have acceptable levels of $NO_X$. The oxygen enrichment device that produces both the oxygen and nitrogen enriched air can include a selectively permeable membrane.

16 Claims, 2 Drawing Sheets

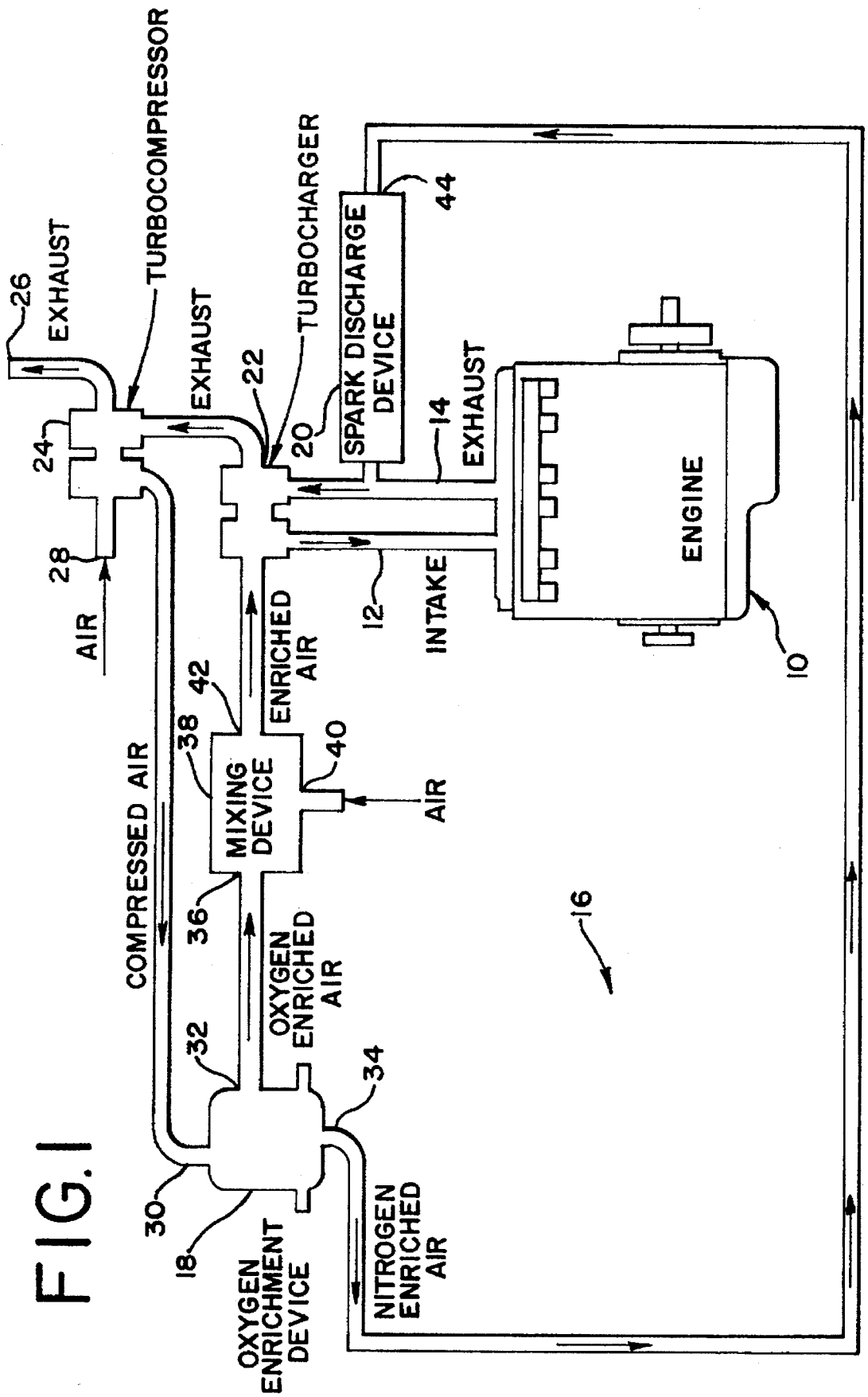

NITROGEN SPARK DENOXER

CROSS REFERENCE TO RELATED APPLICATION

This application is a continuation-in-part application of U.S. patent application Ser. No. 08/019,102 filed on Feb. 18, 1993 and is assigned to the same assignee as the assignee of this application.

CONTRACTUAL ORIGIN OF THE INVENTION

The United States Government has rights in this invention pursuant to Contract No. W-31-109-ENG-38 between the United States Government and Argonne National Laboratory.

BACKGROUND OF THE INVENTION

1. Field of the Invention

This invention relates to a method and apparatus for reducing oxides of nitrogen in the exhaust emissions of an internal combustion engine, and more particularly, to a new and improved spark discharge device for forming atomic (monatomic) nitrogen from molecular nitrogen so that the atomic nitrogen can be injected into the exhaust of an internal combustion engine to reduce oxides of nitrogen in the exhaust to nitrogen and oxygen.

2. Background of the Invention

If oxygen enriched air is used as part of the intake of an internal combustion engine, the engine's power density tends to be increased and the particulate emissions from the engine tend to be reduced. On the other hand, the use of such oxygen enriched air tends to increase the amount of oxides of nitrogen ($NO_x$) that are present in the engine's exhaust. This increase in the amount of $NO_x$ in the engine's exhaust has concerned developers and manufacturers of internal combustion engines because legal regulations dealing with emissions from an internal combustion engine include specifications limiting the amount of $NO_x$ that may be present in such emissions. Consequently, the developers and manufacturers of internal combustion engines would like to obtain the advantages of using oxygen enriched air in the intake of an internal combustion engine, but at the same time would like to reduce the amount of $NO_x$ that is present in the engine's emissions.

One way of reducing $NO_x$ in any stream of gas is to inject atomic nitrogen into the stream of gas. For example, an article entitled "Effect of nitrogen-containing plasmas on stability, NO formation and sooting of flames" by J. C. Hilliard and F. J. Weinberg appearing in *Nature*, Vol. 259, page 556 (Feb. 19, 1976) indicates that nitrogen atoms from a plasma can be injected into a fast flowing stream of nitric oxide in argon and synthetic exhaust gas mixes. The article further states (page 557) that "[r]eductions in nitric oxide from 3,000 p.p.m. to a residual 80 p.p.m. were readily obtained in flows up to 250 1 $min^{-1}$." In German Patent Application No. DE 34 09 859 A1, which was filed Mar. 17, 1984, was published Sep. 19, 1985, and is entitled "Denitration of Waste Gases", the $NO_x$ in the waste gases from combustion engines and plants is formed into nitrogen and oxygen by introducing nitrogen atoms into the flow of such waste gases. In that German patent application, the amount of nitrogen atoms introduced into the waste gas stream is dependent on the NO concentration measured upstream and downstream of the generator of the nitrogen atoms.

One problem associated with the injecting of atomic nitrogen into the exhaust of an automobile engine is providing a source of nitrogen from which the atomic nitrogen can be formed. One of the most common sources from which atomic nitrogen can be formed is ammonia ($NH_3$), but at the present time, it is not practical to store ammonia in an automobile. Even if a source of molecular nitrogen is available, an additional problem associated with the injection of atomic nitrogen into the exhaust of an automobile engine is the forming of the atomic nitrogen. A sufficient quantity of atomic nitrogen has to be produced in order to reduce the $NO_x$ in the exhaust of an automobile engine to nitrogen and oxygen. However, the atomic nitrogen needs to be produced in or in close proximity of the exhaust stream because atomic nitrogen tends to be unstable.

Accordingly, it is an object of the present invention to provide a new and improved method and apparatus for forming atomic nitrogen from molecular nitrogen so that the atomic nitrogen can be injected into the exhaust of an internal combustion engine to thereby reduce oxides of nitrogen in the exhaust to nitrogen and oxygen.

It is another object of the present invention to provide a new and improved spark discharge device for producing atomic nitrogen in or near the exhaust of an internal combustion engine so that the oxides of nitrogen present in that exhaust will be reduced to nitrogen and oxygen as the atomic nitrogen is so introduced into the exhaust.

It is yet another object of the present invention to provide a new and improved method and apparatus for reducing the amount of $NO_x$ in the emissions from an internal combustion engine by utilizing a modified automotive spark plug to produce a pulsating spark in a spark gap that forms atomic nitrogen from nitrogen enriched air that is produced by a selectively permeable membrane and is introduced into the spark gap so that the atomic nitrogen can be introduced into the exhaust of an internal combustion engine.

SUMMARY OF THE INVENTION

In accordance with these and many other objects of the present invention, a $NO_x$ control system for an internal combustion engine embodying the present invention includes an oxygen enrichment device that produces oxygen enriched air and nitrogen enriched air. The oxygen enriched air may be provided to the intake of the internal combustion engine for combustion of the fuel. In order to reduce the amount of $NO_x$ in the exhaust of the internal combustion engine, the molecular nitrogen in the nitrogen enriched air produced by the oxygen enrichment device is supplied to a spark plug that is mounted in exhaust outlet of an internal combustion engine. The spark plug includes a channel that extends from an inlet adjacent the top, positive electrode of the spark plug, through a central portion of the positive electrode that extends through the body of the spark plug to an opening adjacent the spark gap formed between a lower tip of the positive electrode and a ground electrode of the spark plug. The spark gap is elongated as compared to a standard automotive spark plug and insulators about a portion of the ground electrode and the spark gap protect the spark gap from the flow of exhaust gases.

As the nitrogen enriched air is expelled at the spark gap of the spark plug, the nitrogen enriched air is exposed to a pulsating spark that is generated across the spark gap of the spark plug by a high DC potential. As a result, a sufficient amount of atomic nitrogen is produced and is injected into the exhaust of the internal combustion engine. The injection of the atomic nitrogen into the exhaust of the internal combustion engine causes the oxides of nitrogen to be reduced into nitrogen and oxygen such that the emissions from the engine will have acceptable levels of $NO_x$. In one embodiment of the present invention, the oxygen enrichment device that produces both the oxygen and nitrogen enriched air can include a selectively permeable membrane as for example disclosed in U.S. Pat. No. 5,051,114 issued on Sep. 24, 1991.

BRIEF DESCRIPTION OF THE DRAWINGS

These and many other objects and advantages of the present invention will become readily apparent from consideration of the following detailed description of the embodiment of the invention shown in the accompanying drawing wherein:

FIG. 1 is a diagrammatic illustration of an internal combustion engine having a $NO_x$ control system embodying the present invention;

DETAILED DESCRIPTION OF THE PREFERRED EMBODIMENT

Figure 3:
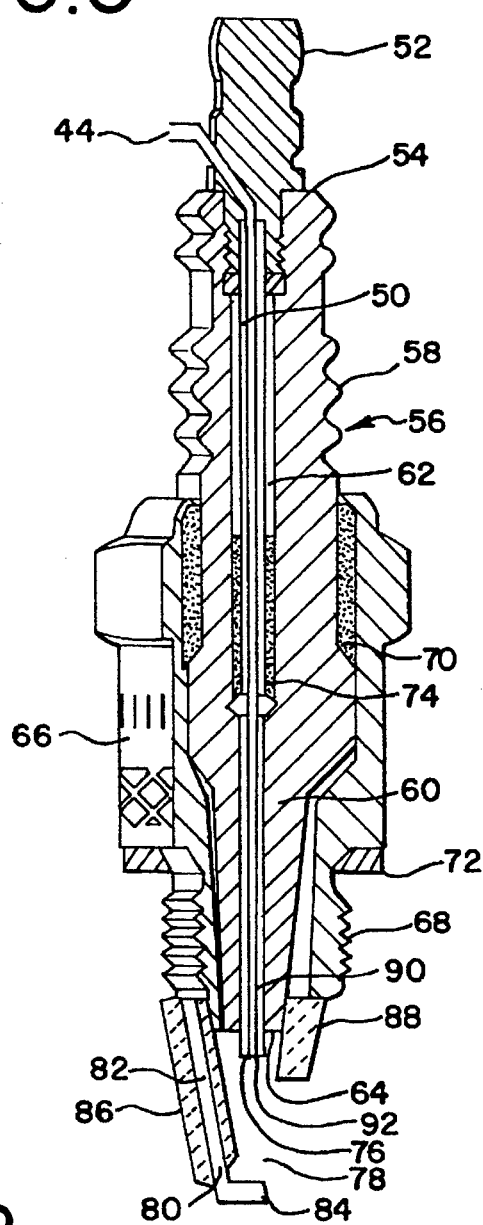
FIG. 3 is a cross sectional view of the spark plug shown in FIG. 2 and used in the $NO_x$ control system of FIG. 1.

Referring now more specifically to FIG. 1, therein is disclosed a diagrammatic representation of an internal combustion engine 10 having an intake line 12 for receiving air that is combined with fuel in the engine 10 and an exhaust line 14 through which is expelled the exhaust gases produced in the engine 10. The exhaust gases contain pollutants including oxides of nitrogen ($NO_x$). In order to control the amount of $NO_x$ that is present in the exhaust gases expelled from the engine 10 through the exhaust line 14, the engine 10 is provided with a $NO_x$ control system that is generally designated by the reference numeral 16 and that embodies the present invention. The $NO_x$ control system 16 includes an oxygen enrichment device 18 that produces oxygen enriched air and nitrogen enriched air. The oxygen enriched air is used as at least a portion of the air that is supplied to the intake line 12 of the engine 10. The nitrogen enriched air is supplied to a spark discharge or generating device 20 that extends into the exhaust line 14 so that the molecular nitrogen in the nitrogen enriched air being supplied to the spark discharge device 20 can be converted to atomic nitrogen and injected into the exhaust gases being expelled from the engine 10 through the exhaust line 14. As a result of the injection of the atomic nitrogen into the exhaust gases, the $NO_x$ in those exhaust gases are reduced to nitrogen and oxygen thereby decreasing to an acceptable level the amount of $NO_x$ in the exhaust gases being expelled from the engine 10.

The engine 10 may be any type of internal combustion engine in which air supplied through the intake line 12 is combined with a combustible fuel. One example of such an engine 10 is a diesel engine. As is the case with all such internal combustion engines, exhaust gases are produced and are expelled through the exhaust line 14.

The exhaust gases flowing through the exhaust line 14 pass through a turbocharger 22 and an optional turbocompressor 24 to an exhaust outlet 26 from which the exhaust gases are discharged into the atmosphere. The movement of the exhaust gases through the turbocompressor 24 drives a pump within the turbocompressor 24 so that air drawn into an air inlet 28 is compressed and supplied under pressure to an inlet 30 of the oxygen enrichment device 18. The oxygen enrichment device 18 is adapted to separate the oxygen and nitrogen present in the air being supplied from the turbocompressor 24 so as to produce oxygen enriched air at an outlet 32 and nitrogen enriched air at another outlet 34. The oxygen enrichment device 18 can be of the type having a selectively permeable membrane that can separate or enrich gaseous mixtures. A membrane of this type is disclosed in U.S. Pat. No. 5,051,114 issued on Sep. 24, 1991. As indicated in that patent, the membrane disclosed in that patent can be used to produce oxygen enriched air by separating oxygen and nitrogen present in the air.

The oxygen enriched air flowing from the outlet 32 is supplied to an inlet 36 of an air mixing device 38. The air mixing device 38 blends the oxygen enriched air supplied to the inlet 36 with air drawn into another inlet 40 so that air that is enriched with a certain amount of oxygen is supplied from an outlet 42 to the turbocharger 22. The turbocharger 22 is driven by the flow of exhaust gases through the exhaust line 14 of the engine 10 and enables a greater amount of air being supplied from the air mixing device 38 to be injected into the engine 10 through the air intake line 12.

As previously indicated, the oxygen enrichment device 18 separates oxygen from the air supplied to its inlet 30 resulting in oxygen enriched air being supplied to its outlet 32. Consequently, the air being expelled from the other outlet 34 of the oxygen enrichment device 18 is nitrogen enriched air. Depending on the membrane used in the oxygen enrichment device 18, the air being expelled from the outlet 34 of the oxygen enrichment device 18 may contain as much as 99% molecular nitrogen.

The nitrogen enriched air being expelled from the outlet 34 is supplied to an inlet 44 of the spark discharge device 20. As shown in FIG. 3 of the drawings, the spark discharge device 20 can be a modified automotive spark plug that is configured so that the molecular nitrogen present in the air being expelled from the outlet 34 can be converted into atomic nitrogen that is injected into the exhaust 14.

More specifically, the spark plug 20 has a center, positive electrode 50 having a high voltage terminal 52 extending from a top end 54 of the spark plug 20 that is adapted to be coupled to a source of high voltage, DC potential. The center electrode 50 extends from the top end 54 through a body portion 56 made of an insulating porcelain type of material such as high resistance Alumina. The body portion 56 has a ribbed, outer upper portion 58 and a lower insulating portion 60. A central channel 62 extends from the top end 54 through the upper portion 58 and the lower portion 60 of the spark plug 20 to a lower or spark gap end 64. The center electrode 50 extends through the channel 62 and is received therein. A metal collar 66 is disposed about the lower body portion 60 and includes screw threads 68 that are normally used to secure an automotive spark plug in a cylinder of an engine. In the case of the spark plug 20, the screw threads 68 are used to secure the lower, spark gap end 64 in the exhaust line 14 of the engine 10 as is for example illustrated in FIG. 2 and is discussed hereinafter. When so secured to the exhaust 14, the screw threads 68 and thereby the collar 66 are grounded to the engine 10.

The collar 66 is secured to the lower body portion 60 by a sealing compound 70 and has a gasket or conical seat 72. A sealing compound 74 also is used to secure the center electrode 50 in the channel 62. A tip portion 76 of the center electrode 50 projects from the lower extremity of the lower body portion 60 such that the tip 76 defines one end of a spark gap 78 formed at the lower end 64 of the lower body portion 60. The other end of the spark gap 78 is defined by a side, ground electrode 80. The side electrode 80 is generally L-shaped with an downwardly extending leg portion 82 that extends angularly from the lower end 64 of the lower body portion 60 of the spark plug 20 and a leg portion 84 that extends generally transverse to the tip 76 of the center electrode 50 in order to define the other end of the spark gap 78.

The side electrode 80 can be made of a nickel alloy and is coupled to the collar 66 such that when the spark plug 20 is secured in the exhaust line 14 by the screw threads 68, the side electrode 80 also will be grounded to the engine 10. In order to insulate the leg portion 82 of the side electrode 80, the leg portion 82 is encased in a ceramic insulator material 86 such as Alumina. A ceramic insulator 88 also is provided about the tip 76 of the center electrode 50. In order to deliver the nitrogen enriched air that is being supplied to the inlet 44 of the spark plug 20 to the spark gap 78, a channel 90 is formed in the center electrode 50 and extends from the inlet 44 to a small opening 92 in the tip 76.

The spark gap 78 needs to be significantly greater in length between the tip 76 and the leg portion 84 of the side electrode 80 than a normal automotive spark plug in order to provide a sufficient amount of discharge area for the spark that is generated from the tip 76 to the leg portion 84 of the side electrode 80 to transform into atomic nitrogen the molecular nitrogen in the nitrogen enriched air being supplied through the inlet 44 and the opening 92. For example, a spark gap 78 of about ¾ inch, and possibly as much as 1 inch, between the tip 76 and the leg portion 84 is sufficient to provide the necessary spark gap area. The ceramic insulator 86 on the leg portion 82 of the side electrode 80 and the ceramic insulator 88 about the tip 76 provide protection around the spark gap 78 and to the spark that is produced across the spark gap 78. In addition, the protection afforded by the insulators 86 and 88 allows the molecular nitrogen to flow out from the small opening 92 without drawing into the spark gap 78 exhaust gases flowing in the exhaust line 14.

As previously indicated, the molecular nitrogen in the enriched nitrogen air being supplied to the inlet 44 of the spark plug 20 flows through the channel 90 to the spark gap 78. In order to transform the molecular nitrogen into atomic nitrogen, a spark needs to be generated across the spark gap 20 from the tip 76 to the leg 84 of the ground electrode 80. Such a spark is generated by supplying a pulsed, relatively high DC potential to the electrode terminal 52 that is coupled via the center electrode 50 to the tip 76. The DC potential so supplied to the terminal 52 is at a minimum of 35–40 kv and preferable about 50 kv. This potential can be provided by modifying a typical ignition system in an automobile including the battery, induction coil, condenser and distributor cap to deliver such a potential. The amount of atomic nitrogen that needs to be produced is in part dependent on the amount of $NO_x$ in the exhaust gases in the exhaust 14 while the amount of atomic nitrogen actually produced is in part dependent on the frequency of the spark being produced across the spark gap 78 which in turn is dependent on the frequency at which the DC potential supplied to the terminal 52 is pulsed. In general the potential being supplied to the terminal 52 should be pulsed at a frequency in the range between 20 Hz and 100 Hz with a frequency of 60 Hz being considered adequate for producing a sufficient amount of atomic nitrogen in the spark gap 78 to reduce the $NO_x$ in the exhaust to an acceptable level. In fact, it has been experimentally found that the amount of $NO_x$ in the exhaust gases in the exhaust 14 generally decreases as the frequency of the spark in the spark gap 78 is increased to at least to 60 Hz.

In the actual construction of the $NO_x$ control system 16, it is preferable that the spark plug 20 be located in as close proximity as possible to the exhaust line 14 because atomic nitrogen produced at the spark gap 78 tends to be somewhat unstable and should be combined with the exhaust gases in the exhaust line 14 as soon as possible after being formed. Accordingly as shown in FIG. 2 of the drawings, the spark gap 78 of the spark plug 20 is preferably positioned in the exhaust line 14.

Figure 2:
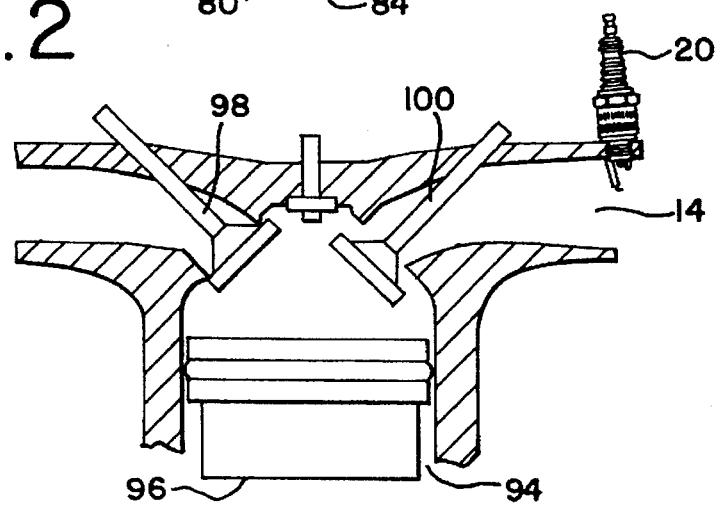
FIG. 2 is an enlarged diagrammatic view of a portion an internal combustion engine illustrating the positioning of a spark plug used in the $NO_x$ control system of FIG. 1 in the exhaust of the internal combustion engine.

More specifically, FIG. 2 shows a portion of the engine 10 and in particular one of the cylinders 94 having a piston 96. A mixture of combustible fuel and oxygen enriched air supplied through the intake 12 of the engine 10 flows through an intake valve 98 when the valve is opened so that the mixture is injected into the cylinder 94 on top of the piston 96. After the mixture of air and fuel is ignited in the cylinder 94, exhaust gases are allowed to escape from the cylinder 94 through a then opened exhaust valve 100 illustrated in FIG. 2. The exhaust gases which contain $NO_x$ flow through the exhaust line 14 and past the lower spark gap end 64 of the spark plug 20 that is threadedly mounted in the exhaust line 14. As is discussed above, the nitrogen enriched air from the outlet 34 of the oxygen enrichment device 18 is supplied through the inlet 44 adjacent the top terminal 52 of the spark plug 20, through the center electrode 50 and out of the opening 92 in the tip 76 of the center electrode 50 to the spark gap 78. As the high DC potential supplied to the terminal 52 is pulsed, a spark of high potential is generated across the spark gap 78 between the tip 76 of the positive center electrode 50 and the leg 84 of the ground side electrode 80. This spark results in molecular nitrogen in the nitrogen enriched air flowing out from the small opening 92 in the tip 76 to be converted to atomic nitrogen. The so-formed atomic nitrogen is thereby injected into the flow of exhaust gases being emitted through the exhaust 14 from the engine 10, and in particular, the cylinder 94. When such atomic nitrogen is so injected in the exhaust gases in the exhaust 14, the atomic nitrogen combines with $NO_x$ contained in those exhaust gases to form nitrogen and oxygen. For example, the following equation would apply with respect to nitric oxide contained in the exhaust gases when such nitric oxide is exposed to the atomic nitrogen formed in the spark gap 78 of the spark plug 20:

$$2NO+2N \rightarrow 2N_2+O_2$$

Accordingly, the injection of atomic nitrogen into the exhaust gases containing $NO_x$ will result in the reduction of the $NO_x$ to nitrogen and oxygen. As a result, the amount of $NO_x$ in the exhaust gases being expelled from the exhaust outlet 26 into the atmosphere will tend to be at acceptable levels.

Obviously, many modifications and variations of the present invention are possible in light of the above teachings. In this regard, the engine 10 described in connection with the above preferred embodiment has a turbocharger 22 for forcing a greater amount of air into the engine 10 through the intake line 12 and a turbocompressor 24 for supplying a greater quantity of air to the oxygen enrichment device 18. On the other hand, the $NO_x$ control system 16 can be used with an engine that does not include any such turbocharger 22 or turbocompressor 24. If the turbocompressor 24 is not utilized, the oxygen enrichment device 18 may have to be increased in size in order to provide the necessary amount of nitrogen enriched air to the inlet 44 of the spark discharge device 20. The $NO_x$ control system 16 also can be used to reduce the level of $NO_x$ in the exhaust of the engine 10 even though the air that is supplied to the engine 10 through the intake line 12 is not oxygen enriched air. All that is necessary is for nitrogen enriched air to be supplied to the spark discharge device 20 in order that molecular nitrogen is transformed into atomic nitrogen which is in turn injected into the exhaust gases being emitted from the engine 10. In fact, more than one spark plug (for example, four spark plugs) can be used to generate a sufficient amount of atomic nitrogen. Thus, it is to be understood that, within the scope of the appended claims, the invention may be practiced otherwise than as specifically described above.

What is claimed and desired to be secured by Letters Patent of the United States is:

1. A $NO_x$ control system for an internal combustion engine that emits exhaust gases containing oxides of nitrogen through an exhaust line, said $NO_x$ control system comprising:

enrichment means for producing from air nitrogen enriched air having molecular nitrogen;

a spark discharge means connected to said enrichment means for receiving said nitrogen enriched air from said enrichment means, said spark discharge means having a channel through which said nitrogen enriched air flows to a spark gap of the spark discharge means which is disposed relative to said exhaust line; and electrode means for receiving a pulsed, high DC potential that is supplied to said spark discharge means such that a pulsed spark is generated across said spark gap and said molecular nitrogen in said nitrogen enriched air is reduced to atomic nitrogen resulting in the oxides of nitrogen within said exhaust gases being reduced to nitrogen and oxygen.

2. A $NO_x$ control system as set forth in claim 1 wherein said electrode means includes a first electrode extending from a first end of said spark discharge means to a tip at a second distal end of said spark discharge means and a second electrode extending from said second distal end of said spark discharge means such that a spark gap is formed between said tip and said second electrode.

3. A $NO_x$ control system as set forth in claim 2 wherein said tip is spaced at least ¾ of an inch from said second electrode.

4. A $NO_x$ control system as set forth in claim 2 wherein said first electrode includes a terminal projecting from said first end of said spark discharge means, said terminal being supplied with said pulsed DC potential such that pulsed sparks are generated across said spark gap.

5. A $NO_x$ control system as set forth in claim 4 wherein said DC potential is 35 kv to 50 kv and is pulsed at a frequency of 20 Hz to 100 Hz.

6. A $NO_x$ control system as set forth in claim 2 wherein an inlet for said nitrogen enriched air is disposed adjacent said terminal at said first end of said spark discharge means.

7. A $NO_x$ control system as set forth in claim 2 including first insulator means about a portion of said second electrode and a second insulator means extending from said second end of said spark discharge means to partially protect said spark gap.

8. A $NO_x$ control system as set forth in claim 1 including sealing means for retaining said first electrode in said channel.

9. A $NO_x$ control system as set forth in claim 1 wherein said spark discharge means includes securing means to secure said spark gap in said exhaust line of said engine.

10. A spark discharge device for use in a $NO_x$ control system for an internal combustion engine that emits exhaust gases containing oxides of nitrogen through an exhaust line, said spark discharge device comprising:

an insulator body portion through which extends a first channel from a terminal end to a spark gap end;

securing means for securing said spark gap end in said exhaust line;

a first electrode secured in said first channel extending from a high voltage terminal at said terminal end to a tip portion at said spark gap end;

a second electrode extending from said spark gap end such that a spark gap is formed between said tip portion and said second electrode;

an inlet adjacent said terminal end for receiving nitrogen enriched air; and a second channel means in fluid communication with said inlet and extending through said first electrode to an opening in said tip, said nitrogen enriched air flowing through said inlet and said second channel to said spark gap such that as said high voltage terminal receives a pulsed, high DC potential a pulsed spark is generated across said spark gap and molecular nitrogen in said nitrogen enriched air is reduced to atomic nitrogen resulting in the oxides of nitrogen within said exhaust gases being reduced to nitrogen and oxygen.

11. A $NO_x$ control system as set forth in claim 10 wherein said tip is spaced at least ¾ of an inch from said second electrode.

12. A $NO_x$ control system as set forth in claim 4 wherein said DC potential is 35 kv to 50 kv and is pulsed at a frequency of 20 Hz to 100 Hz.

13. A method of reducing the amount of oxides of nitrogen present in the exhaust gases being emitted from an internal combustion engine through an exhaust line, said method comprising:

producing nitrogen enriched air having molecular nitrogen;

supplying said molecular nitrogen in said nitrogen enriched air to a spark discharge means having a spark gap disposed in said exhaust line, said spark gap being sufficiently elongated to produce atomic nitrogen when a spark is generated across said spark gap; and supplying said spark discharge means with a pulsating DC potential so that a pulsating spark is generated across said spark gap such that the atomic nitrogen so produced will be injected into said exhaust line in order that oxides of nitrogen within said exhaust gases are formed into nitrogen and oxygen.

14. A method as set forth in claim 13 wherein said nitrogen enriched air is produced by separating oxygen from air with a selectively permeable membrane.

15. A method as set forth in claim 13 wherein said DC potential is between at least 35 kv and 50 kv and is pulsated at a frequency between 20 Hz and 100 Hz.

16. A method as set forth in claim 13 wherein said spark gap is at least ¾ of an inch.

* * * * *